(12) United States Patent
Sanders et al.

(10) Patent No.: US 9,904,505 B1
(45) Date of Patent: Feb. 27, 2018

(54) SYSTEMS AND METHODS FOR PROCESSING AND RECORDING AUDIO WITH INTEGRATED SCRIPT MODE

(71) Applicant: Zaxcom, Inc., Pompton Plains, NJ (US)

(72) Inventors: Glenn Norman Sanders, Franklin Lakes, NJ (US); Howard Glenn Stark, Sparta, NJ (US)

(73) Assignee: Zaxcom, Inc., Pompton Plains, NJ (US)

( * ) Notice: Subject to any disclaimer, the term of this patent is extended or adjusted under 35 U.S.C. 154(b) by 0 days.

(21) Appl. No.: 15/094,617

(22) Filed: Apr. 8, 2016

Related U.S. Application Data (60) Provisional application No. 62/146,152, filed on Apr. 10, 2015.

(51) Int. Cl.
*G06F 17/00* (2006.01)
*G06F 3/16* (2006.01)
*G06F 3/0484* (2013.01)

(52) U.S. Cl.
CPC ............ *G06F 3/16* (2013.01); *G06F 3/04842* (2013.01)

(58) Field of Classification Search
CPC .................. G06F 3/16; G06F 3/04842; G11B 27/00–27/36; H03M 1/70–1/88
USPC ..................................... 341/138–141; 700/94
See application file for complete search history.

(56) References Cited

U.S. PATENT DOCUMENTS

| | | | | |
|---|---|---|---|---|
| 7,825,322 | B1 * | 11/2010 | Classen | H04H 60/04 84/477 R |
| 9,286,383 | B1 * | 3/2016 | Robinson | G06F 17/30743 |
| 2011/0320198 | A1 * | 12/2011 | Threewits | G09B 19/04 704/235 |
| 2013/0057759 | A1 * | 3/2013 | Suess | G11B 27/10 348/462 |
| 2013/0124984 | A1 * | 5/2013 | Kuspa | H04N 9/475 715/255 |

* cited by examiner

*Primary Examiner* — Hemant Patel
(74) *Attorney, Agent, or Firm* — Rita C. Chipperson; Chipperson Law Group, P.C (57) ABSTRACT

Improved systems and methods for processing and recording audio with integrated script mode. A script is displayed to a user in conjunction with auto-selected and/or user configured script parameters. The script is manually advanced during a first recording of a take and the script movement is recorded. In subsequent re-takes of the same take, the script advances automatically, thereby alleviating the need of the user to manually advance the script.

6 Claims, 7 Drawing Sheets

SYSTEMS AND METHODS FOR PROCESSING AND RECORDING AUDIO WITH INTEGRATED SCRIPT MODE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Embodiments of the present invention generally relate to improved systems and methods for processing and recording audio with integrated script mode.

Many systems and methods have been created to record performance audio. Some such systems include a multi-track audio recorder wired to one or more microphones or receiving wireless audio from one or more microphones. That is, one or more performers performing on a sound stage are recorded by one or more microphones that are directly wired to, or communicate wirelessly with, a single or multiple track audio recorder. In some such systems, the audio recorder combines the single track of audio received from each microphone to create one multi-track audio file. In many such systems, the received audio and/or the multi-track audio is timestamped with a time reference signal such as a Society of Motion Picture and Television Engineers ("SMPTE") timecode signal containing information regarding the hour, minute, second, frame, type of timecode (i.e., nondrop or drop frame), and user-definable information. Such information allows audio to be more easily matched and/or combined with simultaneously recorded video or other performance components.

Typically, the quality of audio recorded by an audio recording device is modified within the audio recorder. That is, a user of the audio recorder listens to the received audio and makes various adjustments to the audio recording circuitry to improve the quality thereof. One such adjustment is gain, or amplification, of the received audio. In some such systems, the change in gain or amplification of the audio is made by modifying one or more amplification circuits located in the audio recorder, and these adjustments may be made locally at the audio recorder via knobs, slides, and the like.

In the process of recording sound for scripted productions via an audio recording system, it is necessary for the sound engineer to view a copy of the script in advance of, or during, recording in order to know how to mix the audio from multiple sources that typically correspond to audio sources from individual actors. The script is typically distributed on a daily basis to the sound engineer in written form.

BRIEF SUMMARY OF THE INVENTION

Briefly stated, in one aspect of the present invention, an audio recording system with integrated script mode is provided.

In one aspect of the present invention, a method of displaying a script to a user of an audio recording system is provided. The method includes: receiving a script file, the script file including data to be performed by at least one performer in order to create a performance, the user recording the performance via the audio recording system, the user modifying at least one audio parameter during the recording; defining at least one script parameter; and displaying at least a portion of the script file in accordance with the at least one script parameter to the user during the recording of the performance.

In another aspect of the present invention, a system for displaying a script to a user of an audio recording system is provided. The system includes a user interface and a processor communicatively coupled to the user interface, the processor further operatively coupled to a non-transitory computer readable medium, comprising instructions stored thereon, which, when executed by the processor, performs the steps of: receiving a script file, the script file including data to be performed by at least one performer in order to create a performance, the user recording the performance via the audio recording system, the user modifying at least one audio parameter during the recording; defining at least one script parameter; and displaying at least a portion of the script file in accordance with the at least one script parameter to the user via the user interface during the recording of the performance.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Figure 1:
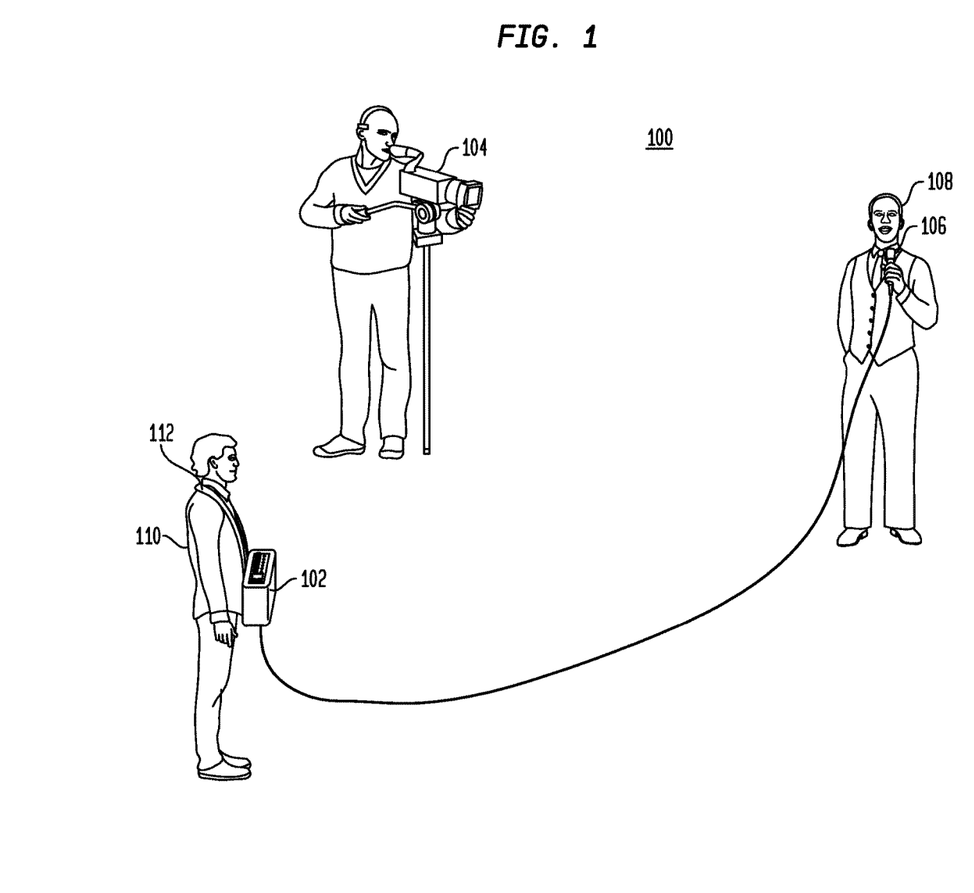
FIG. 1 depicts the components of a recording system in accordance with one embodiment of the present invention including, inter alia, an audio recorder, a video recorder, a performer.

Referring first to FIG. 1, depicted is recording system 100 in accordance with one embodiment of the present invention. Recording system 100 records audio and video events, such as performances, movie takes, etc. having one or more performers.

In the embodiment of the present invention depicted in FIG. 1, recording system 100 includes audio recorder 102, video recorder 104, audio input device 106, performer 108, and sound engineer 110. Live audio transmitted by one or more audio input devices 106 is recorded by audio recorder 102. Optionally, video may be simultaneously recorded by video recorder 104. Although only one audio input device 106 and performer 108 are depicted in recording system 100 of FIG. 1, any number of audio input devices 106 and/or performers 108 may be substituted as audio recorder 102 may be equipped for multi-track recording.

Additionally, although system 100 is shown including wired audio input devices 106, wireless audio input devices may be substituted without departing from the scope of the present invention. In such a scenario, audio recorder 102 may be coupled to an audio receiver which receives the digital audio signals wirelessly and transmits them to an analog form for processing by audio recorder 102. In other embodiments of the present invention, an audio receiver and/or other components capable of converting the wirelessly received digital audio signals into analog form are integral to audio recorder 102.

Audio recorder 102 may be virtually any commercially available audio recorder intended for use in a system such as recording system 100. Audio recorder 102 receives audio from audio input device(s) 106 as typically generated by a performer 108 or the like. In the depicted system, audio recorder 102 is a Nomad compact if a recorder as manufactured by Zaxcom®, Inc., however, the systems and methods of the present invention may be implemented in virtually any commercially available, or yet to be created, audio recorder suitable for the intended purpose as described herein.

Video recorder 104 may be any commercially available video recorder capable of recording live video. Additionally, although one video recorder 104 is shown, multiple video recorders 104 may be substituted. Audio input device 106 is discussed below in greater detail with respect to FIG. 2A.

Figure 2A:
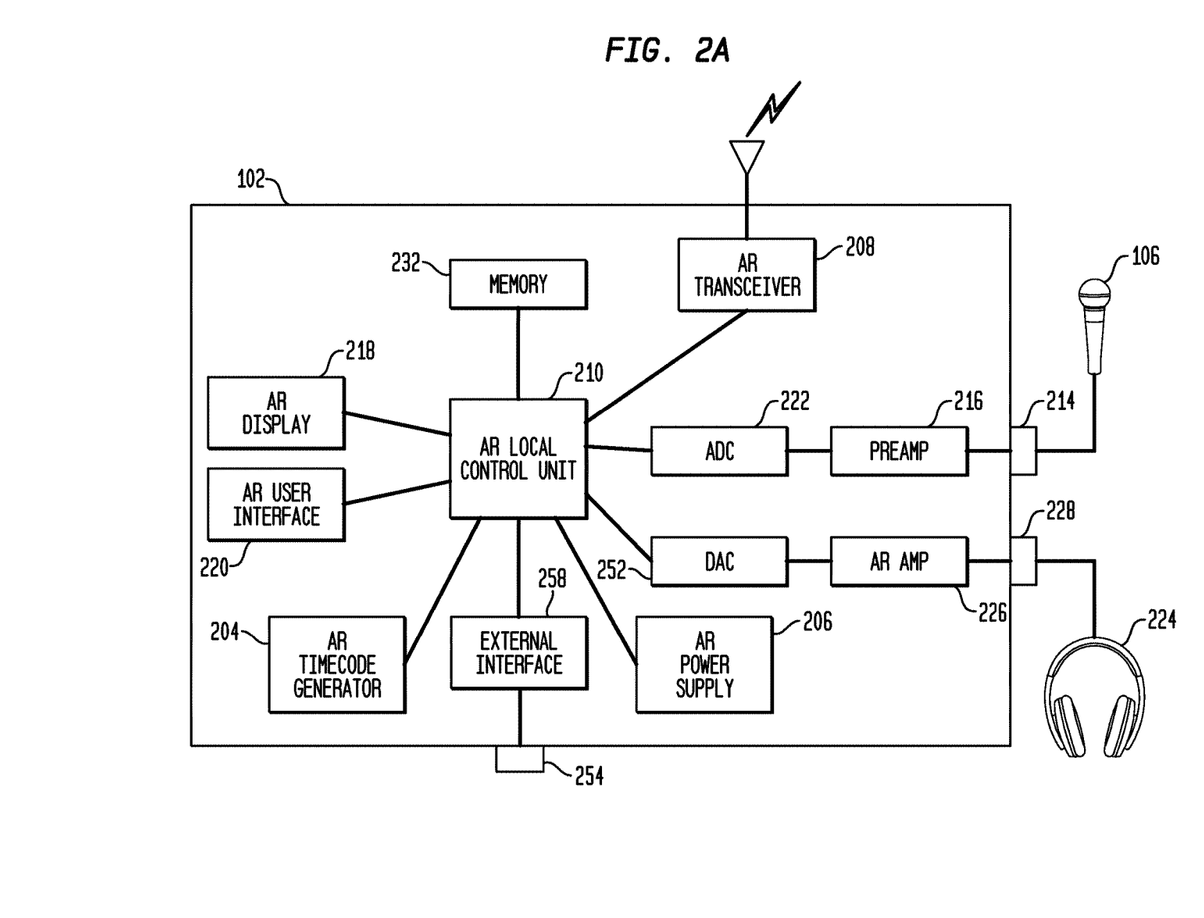
FIG. 2A depicts a block diagram of the internal components of an audio recorder in accordance with one embodiment of the present invention.

Turning next to FIG. 2A, depicted is a block diagram of one embodiment of audio recorder 102 for use with system 100. Such audio recorders may be manufactured in a form compatible with over-the-shoulder use, such as those typically worn by audio engineers, sound mixers, and the like. For example, in one embodiment, audio recorder 102 is equipped with strap holders capable of holding audio recorder 102 via the shoulder(s) of a sound engineer or the like via a shoulder harness 112. However, the features of the present invention may be implemented in audio recorders that are not designed for over-the-shoulder use. Such audio recorders may rest on a sound cart or the like that is easily transportable on and off the recording stage.

In this embodiment, audio recorder 102 includes, inter alia, timecode generator 204, AR power supply 206, AR transceiver 208, AR local control unit 210, AR audio input device port 214, AR preamp 216, AR display 218, AR user interface 220, AR ADC 222, AR amp 226, AR audio output port 228, digital-to-analog converter 252, external interface 258, memory 232, and external interface port 254.

In the depicted embodiment, AR transceiver 208 is a Cypress CYRF6936 2.4 GHz transceiver; however, alternate transceivers may be substituted including, without limitation, a Micrel Semiconductor RadioWire® transceiver. Also, transceivers having varying frequencies may also be substituted. It should be noted that any combination of hardware and software may be substituted for any component described herein without departing from the scope of the present invention. Transceiver 208 allows audio recorder 102 to transmit and receive data including, without limitation, a master time reference signal, digital commands (e.g., remote control data), audio, and the like to and from other devices of the recording system including, without limitation, video recorder 104.

In one embodiment of the depicted recording systems, video recorder 104 is equipped with a transceiver capable of communicating with audio recorder 102. For example, video recorder 104 may receive audio locally and transmit same digitally and wirelessly to audio recorder 102 to allow sound engineer 110 to confirm that the audio is being properly recorded at video recorder 104. In another exemplary use of transceiver 208, transceiver 208 allows the audio being recorded to be transmitted to others involved with the performance being recorded.

The block represented by AR Timecode Generator 204 generates a master time reference signal and/or timecodes, and it may be implemented via hardware or software. For example, the master time reference signal may be generated by audio recorder 102 via a software process. Or, alternatively, the time reference signal may be generated by dedicated hardware (e.g., a clock), a second local control unit, or the like. The master time reference signal may also be generated by an independent timecode generator that transmits timecodes to audio recorder 102 wirelessly or via a cable or the like connected from the independent timecode generator to a dedicated or multi-purpose external interface port 254. In the latter scenario, the timecodes received via timecode external interface port 254 may be optionally converted, buffered, and/or amplified prior to transmission to AR local control unit 210.

In one aspect of the present invention, the time reference signal generated by AR timecode generator 204 is an SMPTE timecode signal containing information regarding the hour, minute, second, frame, type of timecode (i.e., nondrop or drop frame), and user-definable information (e.g., the transport status of audio recorder 102, the name of a scene, the name of a take, an audio input device identifier that identifies the audio input device from which the respective audio was received, a track identifier that identifies the track of audio which may include the actor or actress recording the respective audio, etc.). This master time reference signal provides a time reference for all components of the recording system, which may use this information for a variety of purposes including, without limitation, synchronization of video and audio and determining the portion of a script to be displayed to a user via AR display 218 as discussed in greater detail below.

Audio recorder 102 receives audio from any compatible audio input device such as AR audio input device 106 or an audio receiver receiving audio from one or more wireless microphones via audio input device port 214. AR audio input device 106 may be any type of commercially available audio input device (e.g., a microphone or audio recorder) and audio input device port 214 may be any commercially available audio input device port that is compatible with AR audio input device 106 and the internal components of audio recorder 102. The received audio is then buffered and/or amplified by AR preamp 216. Then, the audio is converted from analog to digital by AR analog to digital converter ("ADC") 222 such that the audio may be read in digital form by AR local control unit 210. In one embodiment of the present invention, ADC 222 and Digital to Analog Converter ("DAC") 252 (as discussed below) are implemented via an Asahi Kasei Microdevices ("AKM") 24-Bit 192 kHz Stereo Audio CODEC having model no. AK4621 (i.e., this device includes a two channel ADC and a DAC). AR preamp 216 may be a New Japan Radio ("NJR") Ultra Low Noise Dual Operational Amplifier having model no. NJM2122M. However, these components are merely exemplary and others may be substituted without departing from the scope of the present invention. Also, although only one AR preamp 216, ADC 222, AR audio input device port 214, and audio input device 106 are depicted, any number of this combination may be substituted to accommodate receipt and recording of audio from a plurality of performers. Also, the gain setting of AR preamp 216 may be manually adjusted by sound engineer 110 during use of audio recorder 102 via AR user interface 220 as described herein.

Audio recorder 102 transmits audio from AR local control unit 210 to any compatible audio output device such as AR audio output device 224 via audio output device port 228 after the audio is converted from digital to audio by DAC 252 (as also discussed above) and amplified by AR amp 226. In some embodiments of the present invention, AR amp 226 is a rail-to-rail quad BiCMOS operational amplifier having part no. TS924 and as manufactured by STMicroelectronics, however, other amplifiers may be substituted without departing from the scope hereof.

AR audio output device 224 may be any type of commercially available audio output device such as an earpiece, headphones, or the like and audio output device port 228 may be any commercially available audio output device port that is compatible with AR audio output device 224 and the internal components of audio recorder 102. In an alternate embodiment, digitally processed audio is converted to analog form via a digital-to-analog ("DAC") internal to AR local control unit 210 via an on-chip DAC. This analog audio is then amplified via AR amp 226 prior to transmission through audio output device port 228 to audio output device 224. In some embodiments of the present invention, AR local control unit 210 may be a digital signal processor such as Texas Instruments part number TMS320C6713. However, the present invention is not so limited. Any combination of hardware and software capable of performing substantially the same function may be substituted for any component described herein without departing from the scope of the present invention. For example, AR local control unit 210 may be eliminated and all of its functions may be implemented via hardware without departing from the scope hereof.

Figure 2B:
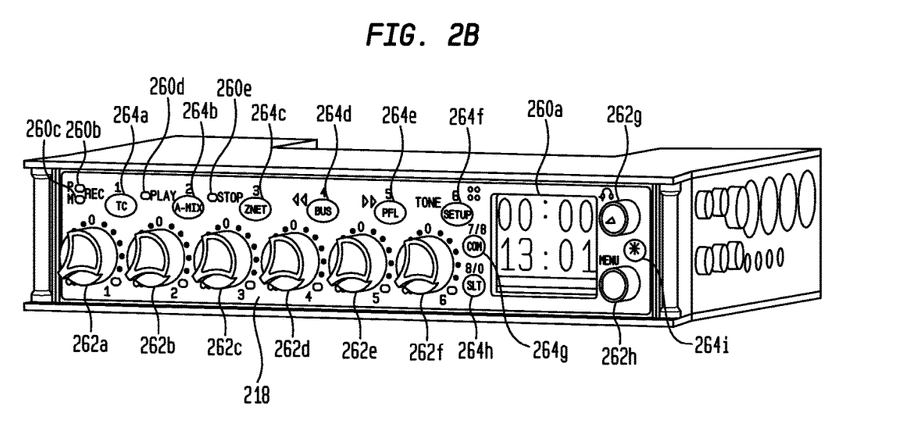
FIG. 2B depicts an external, front view of an audio recorder in accordance with one embodiment of the present invention.

AR recorder 102 also includes AR display 218 as depicted in the front view of FIG. 2B. As shown, AR display 218 includes one main substantially rectangular display 260a as well as a plurality of lamp type indicators 260b-260e. AR display 260a may be a small liquid crystal display ("LCD") module such as that manufactured by Crystal Clear Technologies and having part no. T220176C06WR00, or as manufactured by Optrex Corp. and having part no. T-51750GD065J-FW-AA, or the like. AR displays 260b through 260e may be light emitting diodes ("LEDs"). However, alternate components for AR display 260 and 260b-260e may be substituted. Embodiments of recording systems such as system 100 are envisioned in which AR displays 260a and/or 260b-260e are eliminated, as applicable, without departing from the scope hereof.

User interface 220 includes a plurality of adjustable inputs 262a through 262h as well as a plurality of two position inputs 264a through 264i. In one embodiment, adjustable inputs 262a through 262h may be any device capable of providing an analog input to AR local control unit 210 such as Incremental Type Encoders as manufactured by Alps® and having part no. EC09E1524405. However, alternate devices may be substituted.

Two position inputs 264a through 264i may be any device capable of providing a two position input to AR local control unit 210 such as push-button type potentiometers. However, alternate devices may be substituted.

Adjustable inputs 262 and two position inputs 264 allow a user to perform local AR functions including, but not limited to, audio input gain adjustment, menu functions, recording functions, playback functions, setup functions, and the like for the audio received from each of the performers 108.

Additionally, audio recorder 102 may include any one of a variety of commercially available batteries to function as or with the power supply 206 without departing from the scope of the present invention. Power supply 206 may be virtually any power component or combination thereof that is compatible with the other components of audio recorder 102 including, but not limited to, a Linear Technology LTC3728 Dual Synchronous Stepdown Switching Regulator. Memory 232 of audio recorder 102 stores data utilized by audio recorder 102 and the processes thereof. For example, memory 232 may locally store audio processed by AR local control unit 210 in one or more audio files. In one aspect of the present invention, local control unit 210 receives recordable audio from one or more audio input devices 106, which may be worn by one or more performers 108 and connect to audio recorder 102 at one or more local audio input device port(s) 214. The locally stored audio files may include timestamps (e.g., timestamps may be stored in the header of the audio file) that indicate when, during the audio event, each segment of audio occurred. The timestamps may be generated based upon timecodes or other time reference signals created by timecode generator 204 or based upon timecodes received via AR transceiver 208 or an external interface port 254 or the like.

Memory 232 may be virtually any type of commercially available removable or non-removable memory including, but not limited to, flash memory cards, compact flash memory cards, Universal Serial Bus ("USB") thumbdisks, and the like. Although one external interface port 254 and external interface 258 is shown in FIG. 2A, these blocks are exemplary and any quantity of external interface port(s) 254 and/or external interface(s) 258 may be substituted or such components may be omitted without departing from the scope of the present invention. External interface port(s) 254 may be virtually any port(s) capable of receiving data and/or signals from a device external to audio recorder 102. For example, external interface port 254 may be, without limitation, an RS-485/RS-422 port, an RS-232 port, a USB port, or combinations thereof without departing from the scope hereof. Any signals received via external interface port(s) 254 are processed by external interface 258 to transform the received signal into ones capable of being processed, or in a better form for being processed by, AR local control unit 210. For example, if external interface port 254 is an RS-485/RS-422 port, then external interface 258 may be a RS-485/RS422 transceiver such as part no. MAX3486 as manufactured by Maxim. However, this is merely exemplary and other ports and interfaces may be substituted or added without departing from the scope hereof.

In some embodiments of the present invention, external interface port(s) may be utilized to direct AR local control unit 210 to set the starting value of the timecode generator 204 (e.g., timecode generation software) to a starting value other than zero. For example, the TimecodeHour, TimecodeMinute, TimecodeSecond, and/or TimecodeFrame variables may be set to a value other than zero and such value may be received via external interface port(s) 254 from an external timecode generator or the like. Such timecodes may also be received wirelessly via AR transceiver 208. However, any type of data or signals may be received via external interface port(s) 254 without departing from the scope hereof.

Although many specific features and functions for audio recorder 102 have been delineated herein, other features and functions may be added or eliminated without departing from the scope of the present invention.

Figure 3:
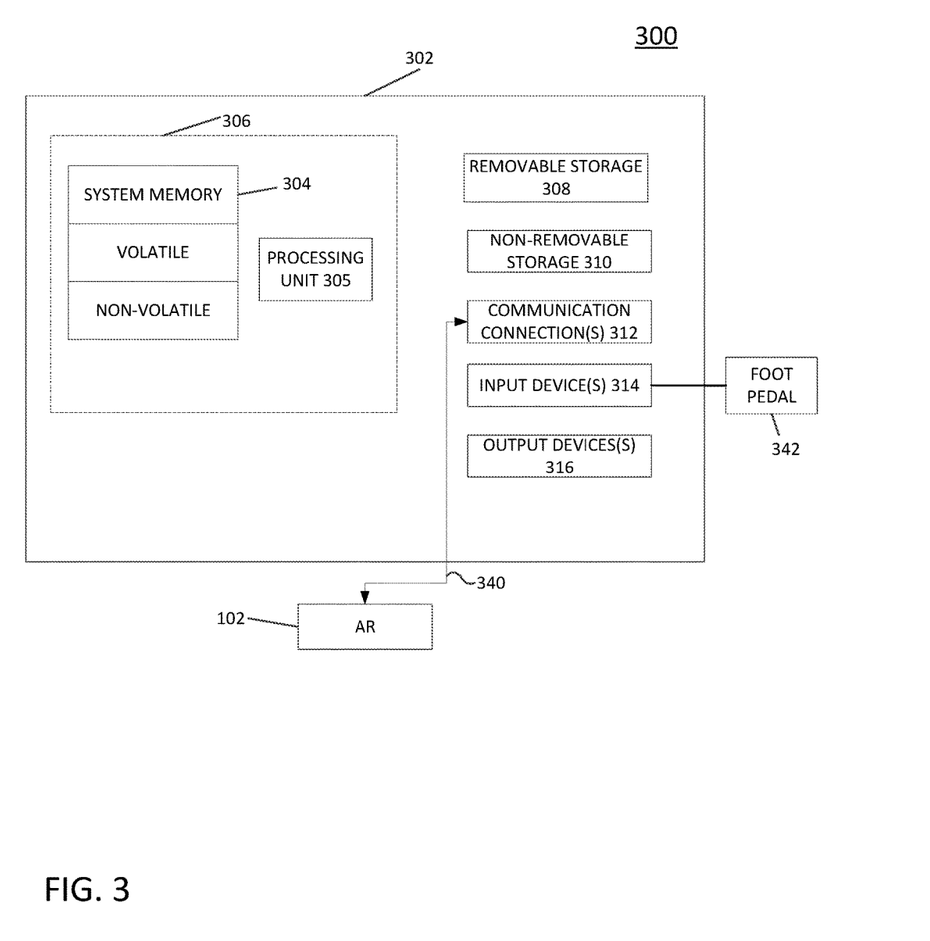
FIG. 3 depicts a block diagram of an audio recorder equipped for script management mode and coupled to a computing device in accordance with one embodiment of the present invention.

Turning now to FIG. 3, depicted is a block diagram 300 of an audio recorder equipped with script management mode in accordance with one embodiment of the present invention. In the depicted embodiment, audio recorder 102 is coupled to a computing device such as computing device 302. Computing device 302 may include a touch screen graphical user interface (e.g., a tablet computing device). The AR user interface such as AR user interface 220 (FIGS. 2A and 2B) allows the sound engineer to control typical audio functions such as mixing and fading of the various audio inputs. The computing device 302 coupled thereto allows the sound engineer 110 to view a script associated with the performance being recorded. However, alternate embodiments of the present invention are envisioned in which the script is shown on the graphical user interface in conjunction with graphical audio recorder controls (i.e., the user can control AR 102, or some of the functions thereof, through computing device 302). Also, alternate embodiments are envisioned in which the computing device is not required because its functions are contained integral to audio recorder 102 without departing from the scope of the present invention. In such a scenario, the script may be displayed to a user via an AR display such as AR display 218 as described above.

In its most basic configuration, as depicted in FIG. 3, each computing device 302 includes at least one processing unit 305 and at least one memory 304 operatively coupled thereto. The processing unit and memory may be tangible elements in a computing device. Or, they may be virtualized, for example as elements of a virtual machine hosted in a so-called computing cloud. Moreover, depending on the exact configuration and type of the computing device, memory 304 may be volatile (such as random access memory ("RAM")), non-volatile (such as read-only memory ("ROM"), flash memory, etc.), or some combination of the two. This most basic configuration is illustrated in FIG. 3 by dashed lines 306. In addition to that described herein, computing device 302 can be any web-enabled handheld device (e.g., cell phone, smart phone, or the like) or personal computer including those operating using Android, Apple, and/or Windows mobile or non-mobile operating systems.

Computing device 302 may have additional features/functionality. For example, computing device 302 may include additional storage (removable and/or non-removable) including, but not limited to, magnetic or optical disks or tape, thumb drives, and external hard drives as applicable. Such additional storage is illustrated in FIG. 3 by removable storage 308 and non-removable storage 310.

Computing device 302 typically includes or is provided with a variety of computer-readable media. Computer-readable media can be any available media that can be accessed by computing device 302 and may be any type of non-volatile media, and removable and non-removable media. Memory 304, removable storage 308, and non-removable storage 310 are all examples of computer storage media. Computer storage media may include, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by computing device 302. Any such computer storage media may be part of computing device 302 as applicable.

Computing device 302 may also contain communications connection 312, such as a wired interface or a wireless air interface that allows the device to communicate with other devices. Such communications connection 312 is an example of communication media. Communication media typically conveys computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency ("RF"), infrared, and other wireless media. The term computer-readable media as used herein includes both storage media and communication media. In the depicted embodiment, AR 102 communicates with computing device 302 via communication medium 340, which may couple to communication connection 312 of computing device 302.

Computing device 302 may also have input device(s) 314 such as keyboard, mouse, pen, voice input device, touch screen, etc. Output device(s) 316 such as a graphical display, speakers, printer, etc. may also be included. In the case of a touch screen, the same device may constitute both an input device 314 (i.e., the portion of the device that reads touches) and an output device (i.e., the portion of the device that displays images to the user). All these devices are well known and may not be discussed in further detail herein if it does not clarify the description. The input and output devices 314 and 316, respectively may be collectively referred to herein as user interfaces. That is, a user interface may include one or more input devices 314 and/or one or more output devices 316.

The various techniques, approaches, and methods described herein may be implemented in connection with hardware, or as a combination of hardware and software. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein. When the program code is accessed and executed by a processor in a machine, such as a computer, the machine becomes an apparatus for practicing the presently disclosed subject matter.

In the case of program code execution on programmable computers, the computing device 302 generally includes a processor, a storage medium readable by the processor (including volatile and non-volatile memory and/or storage elements), at least one input device, and at least one output device. One or more programs may implement or utilize the processes described in connection with the presently disclosed subject matter, for example, through the use of an application-program interface ("API"), reusable controls, or the like. Such programs may be implemented in a high-level procedural or object-oriented programming language. However, the applications and other programs described herein may be implemented in assembly or machine language, if desired. In any case, the language may be a compiled or interpreted language, and combined with hardware implementations.

In the depicted embodiment of the present invention, the input devices 314 include a foot pedal 342 connected to computing device 302. The foot pedal allows the sound engineer or other user to perform functions including, but not limited to, accepted auto-selected script parameters, advance the portion of the script depicted on the display of computing device 302, and the like in a hands-free manner. This frees the user's hands for use in controlling various audio parameters (e.g., audio gain) via AR 102 while simultaneously viewing the current position of the script (e.g., adjusting the linear faders on the audio recorder mixing panel). Although the depicted embodiment of the present invention utilizes a foot pedal for script control, alternate methods may be substituted without departing from the scope of the present invention including, without limitation, pressing a graphical button, clicking a computer mouse, trackball, etc. In such embodiments, the foot pedal may be omitted.

In the audio recorder with integrated script management mode, the sound engineer is able to view a copy of the script associated with the performance to be recorded via a display such as that associated with computing device 302. The script may be imported into computing device 302 in a plurality of manners. For example, the script file may be copied to removable storage (e.g., a thumb drive) which may then be plugged into a USB port or the like of computing device 302. Or, if computing device 302 is Internet-enabled, the script may be downloaded via the Internet and saved to removable storage 308, non-removable storage 310, and/or system memory 304. In the depicted embodiment of the present invention, the script file is a file created with Final Draft® as distributed by the Final Draft company. However, alternate script files may be substituted without departing from the scope of the present invention.

In the present invention, the audio recorder is equipped with software that automatically extracts metadata (e.g., character names and color coding) from the script file and overlays the color coding and character names onto the audio inputs to facilitate audio processing and mixing as discussed in greater detail below with respect to FIG. 5.

In the depicted embodiment of the present invention, the sound engineer or other user determines which portions of the imported script information he or she wishes to view (e.g., dialogue, set direction, etc.) on the display of computing device 302.

Figure 4A:
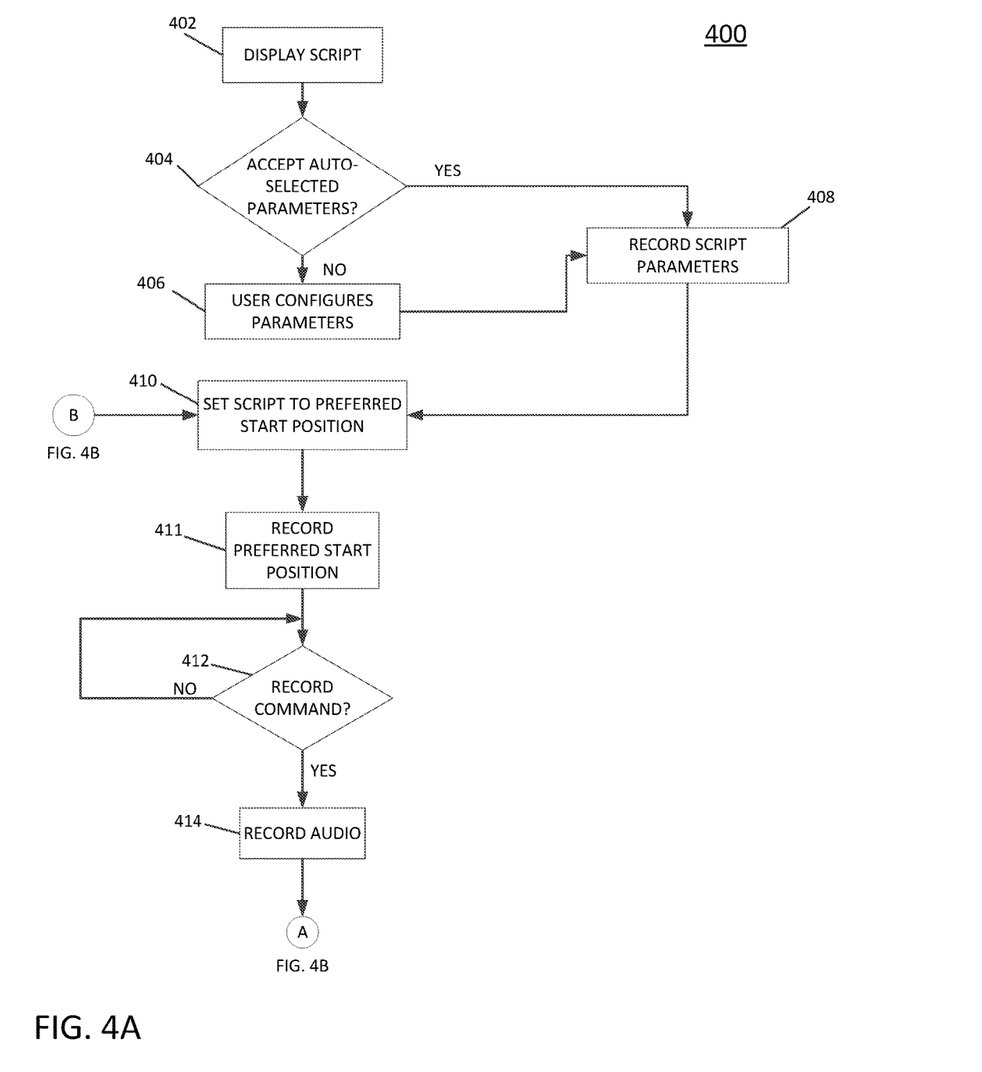
FIGS. 4A and 4B depict a flowchart of one method of integrating a script mode in an audio recorder in accordance with one embodiment of the present invention.
Figure 4B:
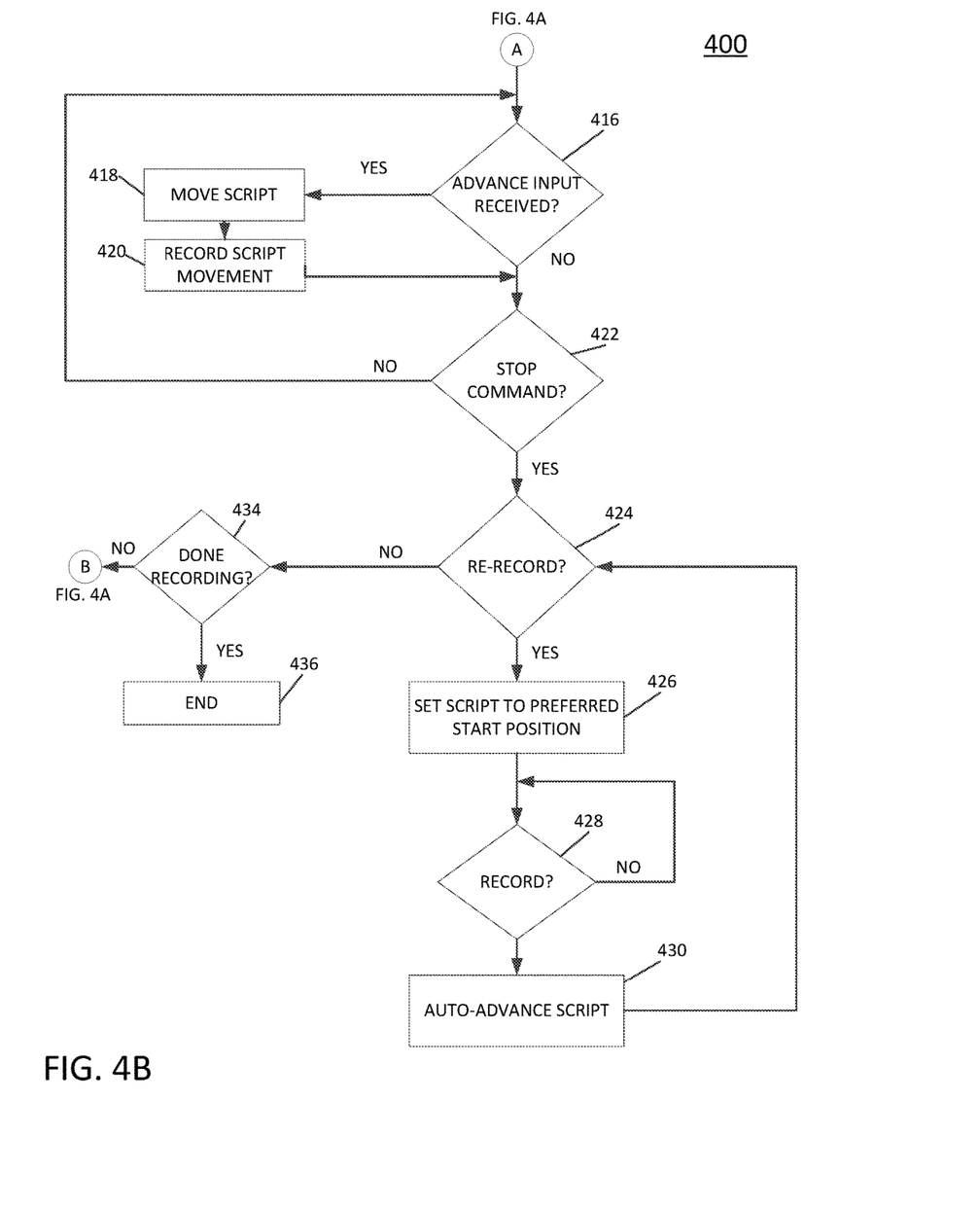

In one aspect of the present invention, automatic positioning of the script as displayed in the script viewer (e.g., the personal computing device, graphical user interface, etc.) is provided. One such method of implementing such automatic positioning is depicted in the flowchart of FIGS. 4A and 4B. In this embodiment, automatic script positioning is tied to the record and stop functions of the associated audio recorder. This data is transferred between computing device 302 and AR 102 via a communication medium 340.

A flowchart of one method of integrating a script viewer in an audio recorder is depicted in FIGS. 4A and 4B in accordance with one embodiment of the present invention. Process 400 begins at 402 with the displaying of a script. This display may involve, for example, reading the script file and displaying the script content via the viewer screen such as the screens or other displays described above with respect to output devices 316 of computing device 302. The script may be read from a hard drive or other memory device (e.g., removable storage 308 or non-removable storage 310) by the computing device 302 executing the script viewer software. The imported script may be displayed in a script viewer graphic displayed via a screen or other display of the computing device 302.

In the depicted embodiment, the script is automatically displayed to a user with parameters that are predefined by the software (i.e., script parameters). One process of performing this auto-selection is discussed below with respect to FIG. 5. In the depicted embodiment, the script parameters are predefined and include a list of characters present in the script and color coding for each of those characters. That is, each character in the script is associated with a color, and the lines spoken or otherwise acted by the character are highlighted in the corresponding character color. That is, when the script is displayed to the user, the lines spoken or otherwise acted by each character is displayed highlighted with the character's corresponding color code as read from a character information database, software configuration file, or the like as created by a process such as process 500 as depicted in FIG. 5. Optionally, set directions may also be depicted to the user and/or highlighted. In the depicted embodiment of the present invention, the choices regarding the colors to be assigned to each character are auto-selected by the software, however, alternate embodiments are envisioned in which the script is displayed without color coding and the colors are then assigned by the user. Also, alternate embodiments are envisioned with varying and/or additional script parameters without departing from the scope hereof.

Next, after the script is displayed to the user with the script parameters, process 400 proceeds to 404 at which the user has the option of accepting or rejecting the auto-selected script parameters (e.g., character names, color coding, and set direction) associated with the imported script. The user may, for example, be prompted with a graphical button labeled "ACCEPT", "EDIT", or "REJECT" and the parameters may be accepted by touching or clicking upon the ACCEPT button with the user's finger, a mouse, or the like. If the user accepts the script parameters, process 400 proceeds to 408, at which these script parameters are stored, and process 400 proceeds to 410.

Alternatively, if at 404 the user does not wish to accept the script parameters that were auto-selected by the script software, process 400 proceeds to 406 at which the user may choose to edit or entirely reject the script parameters in the same manner described above with respect to accepting the script parameters. If the user rejects the parameters, the script will be displayed without any modification in accordance with the script parameters. Alternatively, if the user edits one or more of the script parameters (e.g., changing the name of a character or the color associated with a character, deleting the set directions, etc.), the script is then displayed with the edited script parameters and the edited information (e.g., character name, color coding, etc.) is updated in the character information database, configuration file, and/or the like. In either scenario, after the parameters are edited or rejected by the user, process 400 proceeds to 408 at which the script parameters are stored.

Next, at 410, process 400 allows the user to advance the portion of the script that is viewable via the display to the user's preferred starting position. In the depicted embodiment, the user selects the preferred starting position via an input device such as the input devices 314 discussed above. Such devices may include, but are not limited to, a foot pedal, a mouse, a graphical scroll bar, and a touch scroll bar. The script is scrolled up or down until the preferred starting position is located at the approximate top of the user's display. After the script parameters have been set as desired by the user, process 400 proceeds to 411, at which the preferred start position is stored. In the depicted embodiment of the present invention, values ranging from 0 to 1.0 are assigned to the entire script, 0 being assigned to the beginning of the script and 1.0 being assigned to the end of the script. All points in between are assigned a value between 0 and 1.0 and the value associated with the preferred starting position is stored as same in memory after selection by the user. This allows the script to return to this preferred starting position as needed and as described in greater detail below.

Next, at 412, process 400 waits for the user to index the audio recorder to record mode (e.g., an audio recorder such as audio recorder 102). In the depicted embodiment, AR 102 and computing device 302 share information via communication medium 340 (e.g., a USB cable, RS-232 cable, wireless Bluetooth transfer, etc.). The type of information share may include, but is not limited to, AR record mode, AR play mode, AR stop mode, and timecode.

In AR record mode, the audio recorder records the one or more performers who are performing the script displayed to the user in order to create a performance. During this recording, the user adjusts one or more audio parameters in order to optimize the quality of the audio recording being created. Such parameters may include, without limitation, audio gain. In many instances, audio parameters are adjusted in advance of, in anticipation of, and/or very quickly after a performer's actions. The ability of the user to quickly and easily see the script during and prior to its performance aids the user in making the necessary audio adjustments in an optimized manner such that the resulting audio recording is of the highest possible quality. This also potentially eliminates or minimizes the need for re-recording as the audio may be optimally recorded on the first take.

When record mode is entered by AR 102, this information is transmitted to computing device 302 via communication medium 340 and is read by process 400 at 412. Audio is recorded by the audio recorder at 414, and process 400 monitors an input device 314 for a request for movement of the script relative to the user's display. That is, as the script data is performed by the one or more performers (e.g., lines are read by the performer, exclamations or other sounds are made by the performer, actions are taken by the performer), the sound engineer or other user scrolls the script relative to the screen such that the portion of the script currently being performed (and/or about to be performed) is viewable. For example, the currently performed portion of the script may be near the top of the display to also allow the sound engineer to view the upcoming portions of the script in order to be best prepared for the audio adjustments that will be required. Movement of the script may be performed via an input device such as the input devices 314 discussed above including, without limitation, a foot pedal, a mouse, a graphical scroll bar, and a touch scroll bar.

In the depicted embodiment, if, at 416, process 400 detects an input to scroll the script as performed by the user, process 400 proceeds to 418 at which the portion of the script being displayed will be changed such that it will appear as if the script is scrolling. Typically, the script will appear as if it is scrolling up and off the display, however, alternate scrolling methods may be substituted without departing from the scope hereof (e.g., scrolling left to right, scrolling top to bottom, etc.).

At 420, as the position of the script relative to the display is changed, a record of the positions is recorded in a memory of the computing device 302 such as removable or non-removable storage 308 and 310, respectively. In the depicted embodiment, these positions are recorded in association with the audio timecode (e.g., SMPTE timecode) in order to more easily match the script position to the respective portion of the audio and/or video recording, however, other methods of recording script position may be substituted without departing from the scope hereof. Further, embodiments of the present invention are envisioned in which the script positions are not recorded.

Script movements will continue to be recorded until a stop recording command is read by process 400 at 422 via, for example, the audio recorder and/or the computing device 302. Again, in the depicted embodiment, the stop command information is transmitted from AR 102 to computing device 302 via communication medium 340. Typically recording will be stopped for process 400 after the current scene is recorded and the sound engineer or other user indexes the audio recorder 102 to stop recording.

Process 400 then proceeds to 424, at which the user determines whether the last performance (or portion thereof) will be re-recorded. If no, process 400 proceeds to 434 at which the user determines whether he or she is done recording or whether the user wishes to record a new scene or the like. If the user is done recording, process 400 proceeds to 436, at which it ends. Otherwise, process 400 returns to 410, at which the user selects a new preferred start position for the script as described in greater detail above. In some scenarios, the new preferred start position may be the current script position. In other scenarios, the position will be adjusted by the user as described above. Either way, process 400 will repeat steps 410 through 422 as described above.

Alternatively, if at 424, the user wishes to re-record the previously recorded performance (or portion thereof, e.g., a "take"), the user selects this option by clicking or otherwise selecting a graphical "Re-Record" button or the like. Thereafter, process 400 proceeds to 426, at which it resets the portion of the script displayed via the display to the user to the preferred starting position previously selected by the user at 410 and stored at step 411. This prepares the script display to facilitate re-recording of the previously recorded scene. In the depicted embodiment of the present invention, during this re-recording, at 430, the script is automatically advanced based on the stored script motion data, as recorded at 420 during the previous recording. More specifically, in all "takes" or re-recordings of the same portion of the performance (e.g., a scene), the motion of the script with the script viewer no longer needs to be managed by the user as the performers will typically execute the script with the same relative timescale take after take until the scene is finally captured by the audio recorder and/or video camera to the satisfaction of the producer.

Figure 5:
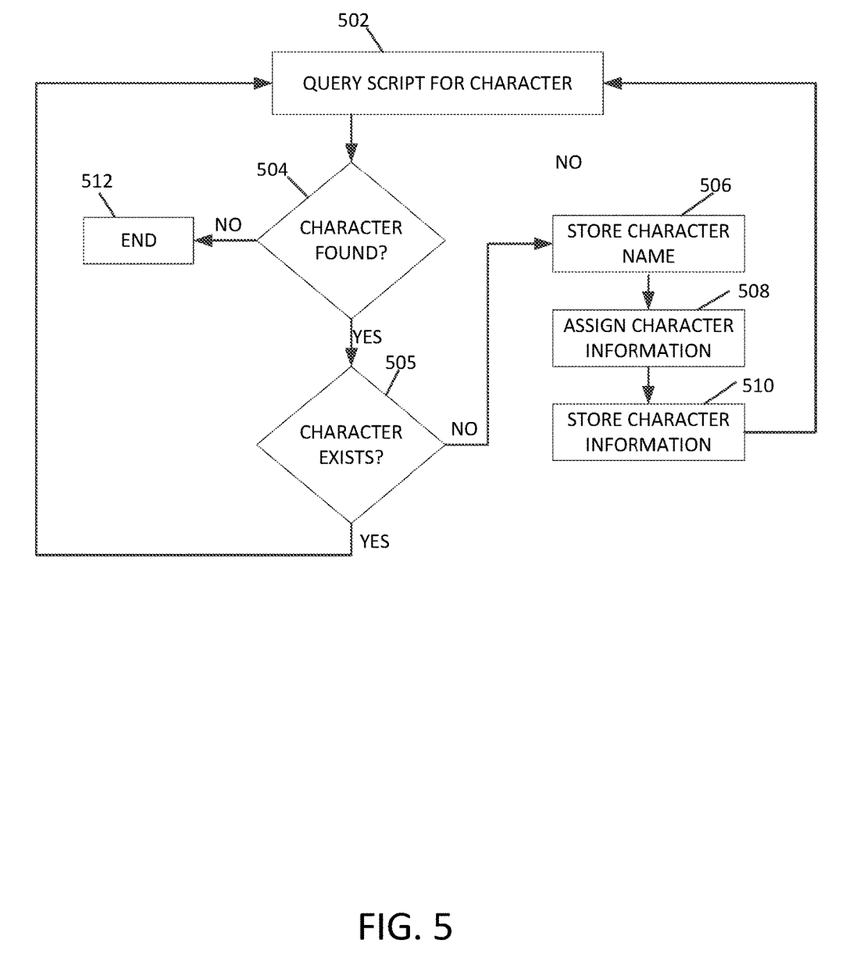
FIG. 5 depicts a flowchart of one method of auto-selecting script parameters in accordance with one embodiment of the present invention.

Referring now to FIG. 5, depicted is one exemplary flowchart of one method of auto-selecting script parameters in accordance with one embodiment of the present invention. Process 500 begins at 502, at which the script file prepared by a third party software provider (e.g., Final Draft as discussed above) is read and analyzed to create a list of character names. For example, one such exemplary script file includes dialogue spoken by a character as a block of text. Prior to the block of text, the character that is to speak (or otherwise act) the dialogue (i.e., the character) is defined in an XML section that precedes the block of text. In such an embodiment, step 502 queries the script file to find the first character section (e.g., an XML section or other section defining character names). Next, at 504, if a character section is found, process 500 proceeds to 506, at which the character name is read and compared against a database or other listing of character names to determine whether the character has already been recorded.

If the character has not yet been recorded by process 500, the process proceeds to 506 at which the character name is stored in the software configuration file and/or in a character database table. Then, process 500 proceeds to 508, at which it auto-assigns character information such as a color code to the new character. Next, at 510, this character information is stored in the database table, configuration file, and/or the like in conjunction with the new character. In the depicted embodiment, color codes are assigned from a pre-defined list of color codes. As each new character is found by process 500, the next available color on the color list is assigned to the new character. In this manner, the same color is not assigned to more than one character. After the character information has been stored, process 500 returns to 502, at which it continues querying the script file for additional characters. If the end of the script file is reached and no new characters are found, process 500 proceeds to 512, at which it ends. If a new character is found, process 500 repeats 504 to 502 to process the new character. These steps repeat until the process ends at 512.

Although the present invention is being described herein in conjunction with the recording of audio, it may be easily applied to the recording of other aspects of the performance including, without limitation, video recording.

Although several processes have been disclosed herein as software, it is appreciated by one of skill in the art that the same processes, functions, etc. may be performed via hardware or a combination of hardware and software. Similarly, although the present invention has been disclosed with respect to wireless systems, these concepts may be applied to hardwired systems and hybrid hardwired and wireless systems without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method of displaying a script of a performance to a user of an audio recording system to facilitate recording of the performance comprising the steps of:
   receiving a script file;
   extracting data from the script file including one of the group consisting of name of at least one performer, data to be performed by the at least one performer in order to create a performance, and combinations thereof;
   defining at least one script parameter;
   displaying at least a portion of the data from the script file in conjunction with the at least one script parameter to the user during the recording of the performance via the audio recording system; and
   scrolling the portion of the data from the script file displayed to the user in conjunction with the at least one script parameter based upon a script movement input received from the user to allow the user to modify at least one audio input gain adjustment of at least one of the at least one performer during the recording of the performance while simultaneously viewing the current position of the script.

2. A method according to claim 1,
   wherein the at least one script parameter includes a unique color code for each of the at least one performer; and
   wherein at least a portion of the data from the script file associated with the at least one performer is displayed highlighted with the color code associated with the at least one performer.

3. A method according to claim 1 further comprising the steps of:
   recording script movement input received from the user during a first recording of at least a portion of the performance as script movement data; and
   automatically altering, for recordings of the at least a portion of the performance recorded subsequent to the first recording, the at least a portion of the data from the script file displayed to the user in conjunction with the at least one script parameter in accordance with the script movement input recorded during the first recording.

4. A system for displaying a script of a performance to a user of an audio recording system to facilitate recording of the performance comprising:
   a user interface;
   a processor communicatively coupled to the user interface, the processor further operatively coupled to a non-transitory computer readable medium, comprising instructions stored thereon, which, when executed by the processor, performs the steps of:
   receiving a script file;
   extracting data from the script file including one of the group consisting of name of at least one performer, data to be performed by the at least one performer in order to create a performance, and combinations thereof;
   defining at least one script parameter;
   displaying at least a portion of the data from the script file in conjunction with the at least one script parameter to the user during the recording of the performance via the audio recording system;
   scrolling the portion of the data from the script file displayed to the user in conjunction with the at least one script parameter based upon a script movement input received from the user to allow the user to modify at least one audio input gain adjustment of at least one of the at least one performer during the recording of the performance while simultaneously viewing the current position of the script.

5. A method according to claim 4,
   wherein the at least one script parameter includes a unique color code for each of the at least one performer; and
   wherein at least a portion of the data from the script file associated with the at least one performer is displayed highlighted with the color code associated with the at least one performer.

6. A method according to claim 4 further performing the steps of:
   recording script movement input received from the user during a first recording of at least a portion of the performance as script movement data; and
   automatically altering, for recordings of the at least a portion of the performance recorded subsequent to the first recording, the at least a portion of the data from the script file displayed to the user in conjunction with the at least one script parameter in accordance with the script movement input recorded during the first recording.

* * * * *